United States Patent
Kirschner

(10) Patent No.: US 12,374,093 B2
(45) Date of Patent: Jul. 29, 2025

(54) SHARED TRAINING OF NEURAL NETWORKS TO REDUCE DATA AND FOR THE OBJECT DETECTION OF IMAGE DATA

(71) Applicant: Robert Bosch GmbH, Stuttgart (DE)

(72) Inventor: Matthias Kirschner, Hildesheim (DE)

(73) Assignee: Robert Bosch GmbH, Stuttgart (DE)

(*) Notice: Subject to any disclaimer, the term of this patent is extended or adjusted under 35 U.S.C. 154(b) by 366 days.

(21) Appl. No.: 17/755,847

(22) PCT Filed: Oct. 5, 2020

(86) PCT No.: PCT/EP2020/077829
§ 371 (c)(1),
(2) Date: May 10, 2022

(87) PCT Pub. No.: WO2021/094036
PCT Pub. Date: May 20, 2021

(65) Prior Publication Data
US 2022/0415033 A1 Dec. 29, 2022

(30) Foreign Application Priority Data
Nov. 11, 2019 (DE) ............ 10 2019 217 363.2

(51) Int. Cl.
*G06V 10/82* (2022.01)
*G06N 3/045* (2023.01)
(Continued)

(52) U.S. Cl.
CPC ............ *G06V 10/82* (2022.01); *G06N 3/045* (2023.01); *G06T 3/4046* (2013.01); *G06T 9/002* (2013.01); *H04N 19/91* (2014.11)

(58) Field of Classification Search
CPC ........ G06V 10/82; H04N 19/91; G06N 3/045; G06T 3/4046; G06T 9/002
See application file for complete search history.

(56) References Cited

U.S. PATENT DOCUMENTS

| 10,713,794 | B1* | 7/2020 | He | G06N 3/084 |
|---|---|---|---|---|
| 2014/0079297 | A1* | 3/2014 | Tadayon | G06V 40/172 |
| | | | | 382/118 |
| 2018/0174047 | A1* | 6/2018 | Bourdev | G06V 10/82 |
| 2018/0285686 | A1* | 10/2018 | Pinheiro | G06F 18/214 |
| 2018/0293713 | A1* | 10/2018 | Vogels | G06V 10/82 |

(Continued)

OTHER PUBLICATIONS

International Search Report corresponding to PCT Application No. PCT/EP2020/077829, mailed Jan. 29, 2021 (German and English language document) (5 pages).

(Continued)

*Primary Examiner* — Qun Shen
(74) *Attorney, Agent, or Firm* — Maginot, Moore & Beck LLP

(57) ABSTRACT

A method for configuring an object detection system includes providing annotated training data comprising image data with defined assignments to at least one object, and training a neural network with a first neural sub-network, which is provided to compress the image data. The first neural sub-network is connected to at least one further neural sub-network. The at least one further neural sub-network is configured to detect an object from the compressed training data. The first neural sub-network is parameterized in such a manner that the object is detected using the at least one further sub-network in a defined quality. The neural sub-networks are trained jointly.

12 Claims, 4 Drawing Sheets

(51) Int. Cl.
*G06T 3/4046* (2024.01)
*G06T 9/00* (2006.01)
*H04N 19/91* (2014.01)

(56) References Cited

U.S. PATENT DOCUMENTS

2019/0377949 A1* 12/2019 Chen ............... G06F 18/217
2020/0311551 A1* 10/2020 Aytekin ............ G06N 3/045
2021/0042580 A1* 2/2021 Chen ................ G06N 3/08
2021/0295166 A1* 9/2021 Rouhani ........... G06N 3/045

OTHER PUBLICATIONS

Bondi et al. "Rate-energy-accuracy optimization of convolutional architectures for face recognition", Journal of Visual Communication and Image Representation, Feb. 2016, XP055766465 (9 pages).
Shen et al. "Lossless compression of curated erythrocyte images using deep autoencoders for malaria infection diagnosis", 2016 Picture Coding Symposium (PCS), IEEE, Dec. 4, 2016, XP033086948 (6 pages).
Bian et al. "A Deep Image Compression Framework for Face Recognition", 2019 2nd China Symposium on Cognitive Computing and Hybrid Intelligence (CCHI), IEEE, Sep. 21, 2019, XP033659968 (10 pages).
Ma et al. "Image and Video Compression with Neural Networks: A Review", IEEE Transactions on Circuits and Systems for Video Technology, Apr. 10, 2019, XP055765818 (16 pages).

\* cited by examiner

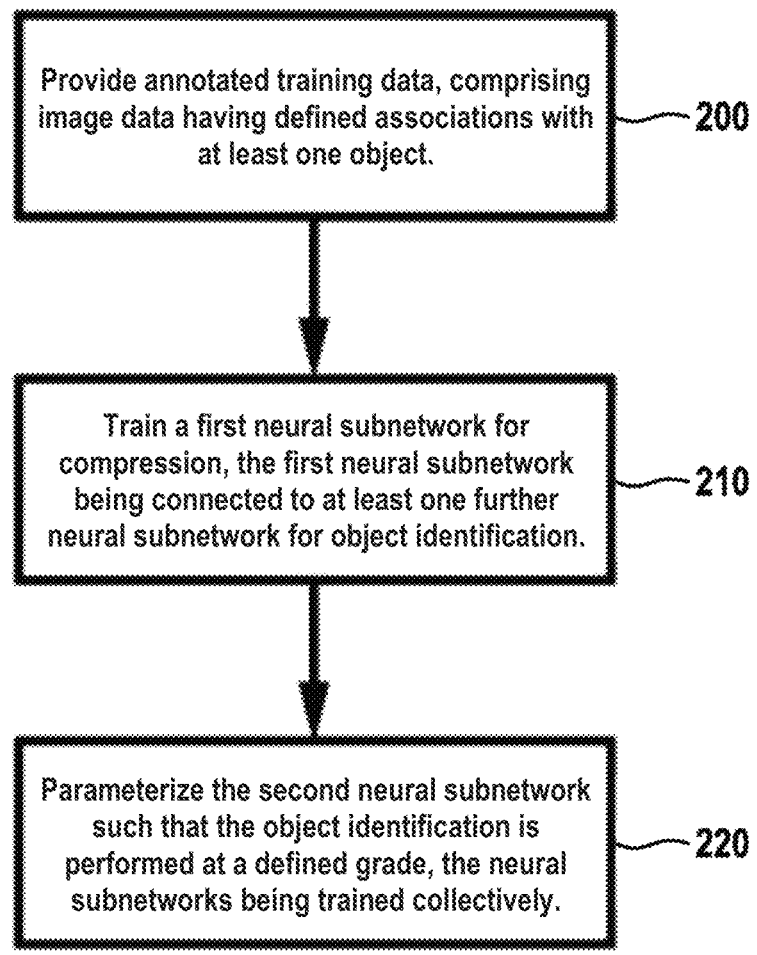

SHARED TRAINING OF NEURAL NETWORKS TO REDUCE DATA AND FOR THE OBJECT DETECTION OF IMAGE DATA

This application is a 35 U.S.C. § 371 National Stage Application of PCT/EP2020/077829, filed on Oct. 5, 2020, which claims the benefit of priority to Serial No. DE 10 2019 217 363.2, filed on Nov. 11, 2019 in Germany, the disclosures of which are incorporated herein by reference in their entirety.

The disclosure relates to a method for configuring an object identification system. The disclosure further relates to a method for identifying an object by means of an object identification system. The disclosure further relates to a sensor device. The disclosure further relates to an object identification system. The disclosure further relates to computer programs. The disclosure further relates to a machine-readable storage medium.

BACKGROUND

Known compression methods for data are based on discrete cosine transformation or wavelet transformation, for example, and are frequently used in sensor systems in order to compress raw data, the compressed raw data usually being transferred to further processing via a data bus. Such compression is required in a multisensor system because the data bus is a significant bottleneck and the volume of data or data rate via the data bus may be reduced by said data compression.

Known methods for compressing sensor data usually minimize general information criteria. However, the compression in this case is unbiased compared to further processing of the data by way of machine learning techniques, which interpret the data later. This means that optimum performance sometimes cannot be achieved in the further processing because relevant data are lost by way of the compression, or optimum compression rates cannot be achieved.

Sensor-based data compressions by means of standard methods (e.g. jpeg for image processing) in order to reduce a transmitted volume of data are known.

SUMMARY

It is an object of the disclosure to provide a method for improved identification of objects by means of an object identification system.

The object is achieved in accordance with a first aspect by a method for optimizing an object identification system, comprising the steps of:
  providing annotated training data, comprising image data having defined associations with at least one object;
  training a neural network having a first neural subnetwork intended to perform compression of the image data, the first neural subnetwork being connected up to at least one further neural subnetwork, wherein
  the at least one further neural subnetwork is intended to identify an object from the compressed training data;
  wherein parameterization of the first neural subnetwork is performed in such a way that the object identification by means of the at least one further subnetwork is performed at a defined grade; and wherein the neural subnetworks are trained collectively.

In this manner, the neural subnetworks are configured in a training phase in such a way that they are suitable for an application in an object identification system. A compression ratio for the image data is advantageously matched to an object identification to be implemented, meaning that the method may advantageously be used to find a good compromise between the two objectives (data compression, grade of the object identification).

This advantageously allows the data compression of the object identification system to be performed during operation in such a way that e.g. irrelevant sensor data may be identified and therefore compressed more heavily. Sensor data that are more relevant are, by contrast, compressed less heavily, which means that object identification is still accomplished sufficiently well with reduced data volume. The proposed training method is performed offline before the object identification system with the compression device optimized therefrom is operated. This advantageously allows better use of a data bus to which one or more sensor devices are connected, or more sensor devices may be connected to the data bus. This ultimately "tailors" the data compression to the target application, lending support to a high grade for the target application of object identification given simultaneously high data compression.

The object is achieved in accordance with a second aspect by a method for identifying an object by means of an object identification system, comprising the steps of:
  compressing the image data by means of a compression device that has been trained in accordance with the first neural subnetwork; and
  performing object identification from the compressed image data by means of an evaluation device that has been trained in accordance with the at least one further neural subnetwork.

The object is achieved in accordance with a third aspect by an object identification system comprising a defined number of functionally interconnected sensor devices and a computer device, which is functionally connected to the sensor devices, for performing the object identification with the compressed sensor data.

The object is achieved in accordance with a fourth aspect by a sensor device comprising a compression device configured by means of a method for configuring an object identification system.

The object is achieved in accordance with a fifth aspect by an object identification system comprising a defined number of functionally interconnected proposed sensor devices and a computing device, which is functionally connected to the sensor devices via a data bus, for performing the object identification from the compressed image data.

The object is achieved in accordance with a sixth aspect by a computer program comprising instructions that, when the computer program is executed by a computer, cause said computer to perform a method for configuring an object identification system.

The object is achieved in accordance with a seventh aspect by a computer program comprising instructions that, when the computer program is executed by a computer, cause said computer to perform a method for identifying an object by means of an object identification system.

The object is achieved in accordance with an eighth aspect by a machine-readable storage medium on which at least one of the aforementioned computer programs is stored.

Preferred developments of the method and of the object identification system are the subject matter of dependent claims.

One advantageous development of the method is distinguished in that parameters of the first neural subnetwork define an extent of a compression of the training data, wherein parameters of the at least one further neural subnetwork define a grade of the object identification. In this manner, a compromise is found between an extent of a compression by means of the first neural subnetwork and a grade of the object identification by means of the at least one further neural subnetwork.

A further advantageous development of the method is distinguished in that the extent of the compression of the training data is defined by a first target function, wherein the grade of the object identification is defined by at least one further target function. This advantageously allows precise definition of the properties of the neural subnetworks, or of the objectives to be accomplished with the neural subnetworks.

A further advantageous development of the method is distinguished in that the training of the first neural subnetwork ascertains weights of the first neural subnetwork, the training of the at least one further neural subnetwork ascertaining the weights of the first neural subnetwork and weights of the at least one further neural subnetwork. This advantageously provides a superordinate general training scenario in which the training of the further neural subnetwork also trains the weights of the first neural subnetwork.

A further advantageous development of the method is distinguished in that areas of the training data with high entropy are compressed less than areas of the training data with low entropy, training data with low entropy being for example image data with the same color and/or image data with a recurring pattern. This produces typical application scenarios for the compression of image data with associated object identification from the image data. The lower the entropy of the training data, the more easily such data may be compressed.

A further advantageous development of the method is distinguished in that the second target function defines at least one from the following: identification of a person, identification of a vehicle, identification of infrastructure. This produces typical application scenarios for the object identification from compressed image data.

A further advantageous development of the method is distinguished in that simplified image data with reduced entropy are generated from the image data, said simplified image data subsequently being compressed by means of the parameterized standard compression device.

A further advantageous development of the method is distinguished in that the compressing of the image data is performed by means of a parameterized standard compression device. In this case, the compressing of the image data is performed by means of a parameterizable standard compression device. Use of a standard compression device (e.g. JPEG compression for image data) is advantageously also possible for an object identification system in this manner.

The invention disclosure is described in detail below with further features and advantages on the basis of a plurality of figures. Elements that are identical or have identical functions bear the same reference signs in this case.

Disclosed method features emerge analogously from corresponding disclosed device features, and vice versa. This means in particular that features, technical advantages and embodiments relating to the proposed methods emerge in an analogous manner from corresponding embodiments, features and advantages relating to the sensor device and the object identification system, and vice versa.

BRIEF DESCRIPTION OF THE DRAWINGS

In the Figures:
FIG. 4 shows a basic representation of an embodiment of the proposed method.

DETAILED DESCRIPTION

Various types of object identification are known, such as object detection and semantic segmentation. The term "object identification" is usually understood to mean object detection, semantic segmentation also being a form of object identification in principle. Object identification is understood below to mean a machine learning method that interprets sensor data for the purpose of perceiving the surroundings.

In the case of object identification in the form of pedestrian detection, for example, large areas of an image are irrelevant or barely relevant for the application and may thus be compressed more heavily. It is entirely possible, however, that these areas have a high entropy, or texture (e.g. cloud-covered sky, complex road texture, etc.), which means that they are not optimally compressed using conventional standard compression methods.

This is advantageously supported by the proposed image-adaptive, trained or optimized data compression with knowledge about the target application "grade of the object identification".

The proposed method is based on multi-objective optimization and a therefore previously trained, or optimized, compression device. For optimization purposes, e.g. multiple neural subnetworks may be trained in series or in parallel and collectively.

Figure 1:
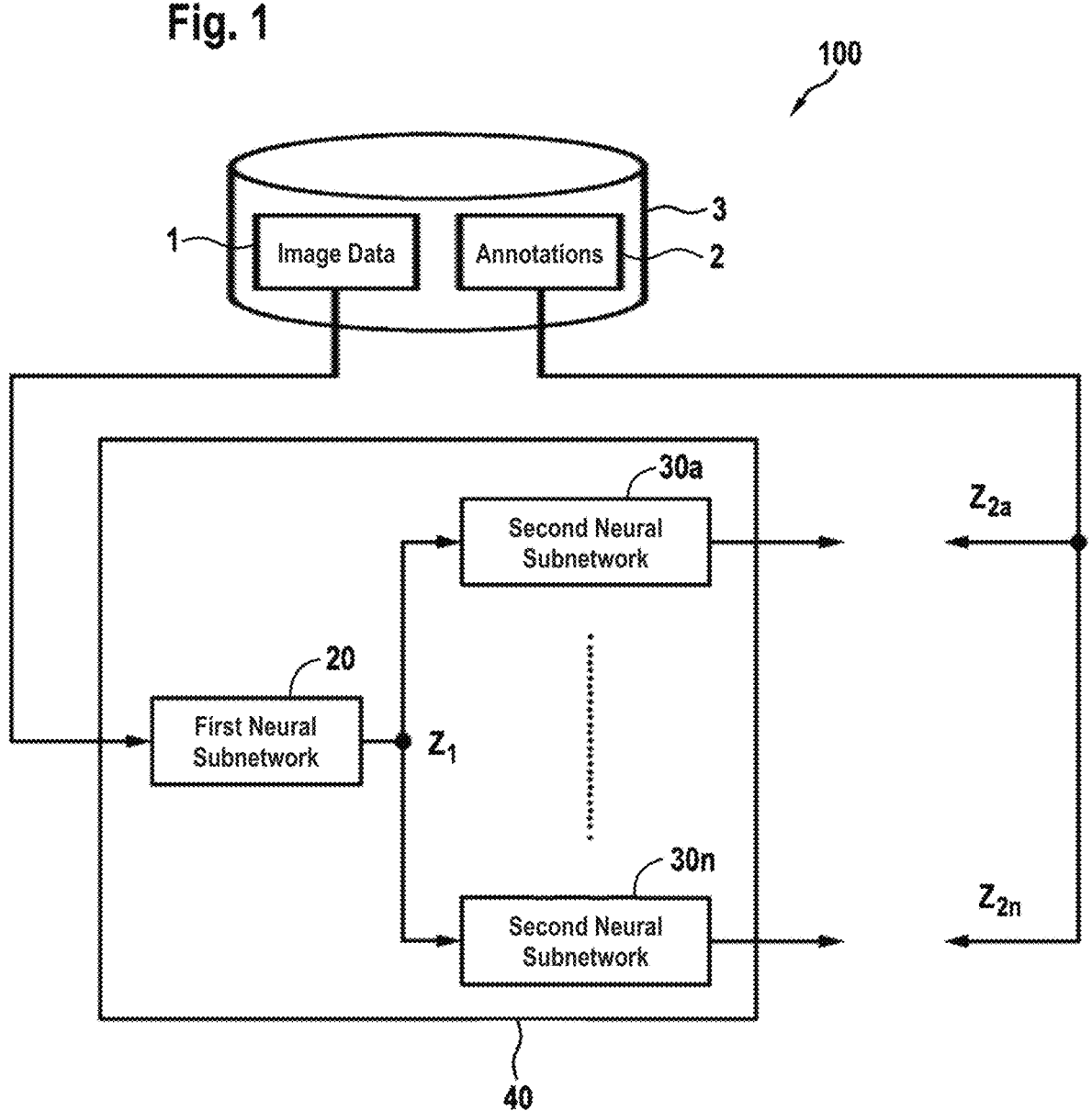
FIG. 1 shows a basic representation of a proposed object identification system in the training mode.

FIG. 1 shows a basic representation of a training scenario of an object identification system 100. It is possible to see annotated training data 3 consisting of image data 1 and annotations 2, the annotations 2 comprising defined associations of objects within the image data 1 (e.g. coordinates of persons in the image data). The association of the annotations 2 with the image data 1 is made in a manner known per se by way of a human activity.

Prior to the training mode of the object identification system, annotated image data 3 are therefore provided, i.e. a large number of images that are manually annotated. This provides specific information for the subsequent training process.

It is possible to see that the image data 1 are supplied to a first neural subnetwork 20 of a neural network 40 that is functionally connected up to at least one further second subnetwork 30a . . . 30n. The first neural subnetwork 20 is defined by a first target function $Z_1$, which specifies an extent of a data compression of the image data 1. The further neural subnetwork 30a . . . 30n is defined by a respective further target function $Z_{2a} \ldots Z_{2n}$, which defines a respective grade of an object identification from the compressed image data 1.

A "grade of an object identification" is understood in this case to mean a discrepancy between the annotated image data and the object identification performed by the further neural subnetwork ("error of the object identification"). The grade of the object identification may therefore consequently be expressed by way of an error between human annotation and machine-based object identification.

At the time of training in accordance with the training scenario of FIG. 1, the individual neural subnetworks 20, 30a ... 30n are combined to form an overall neural network 40 and are trained collectively. The target function for the overall network 40 is a combination of the target functions $Z_1, Z_{2a} \ldots Z_{2n}$ of the individual neural subnetworks. The first neural subnetwork 20 ascertains an intermediate representation of the image data 1. The grade ("compressibility") of this intermediate representation is assessed using the first target function $Z_1$ ("compression target function"). The intermediate representation is then used as an input for one or more further neural networks 30a ... 30n ("application networks"), which accordingly compute their output from this representation. The grade of the respective output is assessed in each case by a further target function $Z_{2a} \ldots Z_{2n}$ In these target functions, the discrepancy between the network output and the application-specific annotations is computed (e.g. positions of pedestrians in the image, positions of infrastructure in the image, etc.).

The aim with the target functions $Z_1 \ldots Z_n$ is to optimize a first target function $Z_1$ given simultaneously optimized further target functions $Z_{2a} \ldots Z_{2n}$. The first target function $Z_1$ preferably defines an extent of a data compression, or a compression rate, so that the compressed image or sensor data can be transmitted via a data bus (not shown) at the lowest possible data rate.

The annotated image data 3 are compared with the outputs from the further neural subnetworks 30a ... 30n. A resultant error yields a gradient that is used in a gradient descent method to adapt gradients, or weights, of the first neural subnetwork 20, so that the further neural subnetworks 30a ... 30n produce the most reliable object identification possible, e.g. in the form of a position of a person in an image.

The further neural networks 30a ... 30n are initialized with random weights to begin with, resulting in errors in the object identification. The aim is for the further neural subnetworks 30a ... 30n to produce the object identification in the manner in which it is available in the form of the annotated image data 3. Consequently, this allows the compressed image data 1 to be used to perform the most accurate and reliable object identification possible.

In a variant of the training process, a standard compression device or algorithm 11a ... 11n may be used for the training, the high-resolution image data 1 being supplied to the standard compression device 11a ... 11n. In a first subvariant, simpler image data are initially generated from the high-resolution image data 1, entropy being able to be reduced e.g. by identifying defined image structures in the image data 1. Afterwards, the simplified image data 1 are compressed by means of the standard compression device 11a ... 11n. The images may then be used in decompressed form to train the first neural subnetwork 20.

In a second subvariant, the standard compression device 11a ... 11n uses predicted parameters, the high-resolution original image data 1 being supplied to the standard compression device 11a ... 11n together with the predicted parameters, the data compression being controlled by the parameters. Optimized parameters for the current image content may then be ascertained, or estimated, for the standard compression device 11a ... 11n. In this case too, the image data are subsequently decompressed and may be used to train the first neural subnetwork 20.

Although the object identification will tend to end up being less accurate with this variant, standard compression algorithms may be used. Consequently, after the training process has been completed, a trained standard compression algorithm is provided together with the trained further neural networks 30a ... 30n.

Since the neural subnetworks 20, 30a ... 30n are trained collectively as a collective neural network 40, each free parameter in all of the subnetworks 20, 30a ... 30n is influenced by all of the target functions $Z_1, Z_{2a} \ldots Z_{2n}$. This means in particular that the parameters in the first subnetwork 20 are selected not only in such a way that an intermediate representation that is compressed in the best possible manner is obtained, but rather also in such a way that the signal that is crucial for each of the respective application networks 30a ... 30n is preserved in the intermediate representation. In this manner, knowledge of which signals are relevant for the application and must not be compressed and which are irrelevant and may thus be heavily compressed, or rejected, is induced in the first neural subnetwork 20 ("compression network").

For example, it is conceivable that image areas, or pixels, with identical colors are compressed more heavily than image areas, or pixels, with different colors. Furthermore, it is also conceivable that image areas of the image data 1 with a lot of texture, or entropy, are supposed to have their information content preserved as far as possible, and therefore are compressed only a little, compared to image areas of the image data 1 with little texture, or entropy.

Consequently, after the training process has been completed, the weights of the neural subnetworks 20, 30a ... 30n are stipulated that are then later used as trained algorithms in an object identification system 100 during normal operation.

The first target function $Z_1$ assesses the compressed sensor data; the further target functions $Z_{2a} \ldots Z_{2n}$ influence the first and the further neural networks 20, 30a ... 30n. Consequently, the neural network 40 is therefore trained, or optimized, not "application agnostically" but rather "application consciously".

In the configuration or training scenario of FIG. 1, it is therefore proposed that a compression device in the form of a first neural subnetwork 20 and evaluation devices in the form of further neural subnetworks 30a ... 30n are interconnected to form an overall system in the form of a neural network 40 and optimized collectively. The target function used is a combined target function comprising a target function for compression and an application-specific target function. The first target function $Z_1$ assesses the grade of the compressed sensor data, whereas the further target functions $Z_{2a} \ldots Z_{2n}$ assess the final object identification by means of the compressed sensor data.

Figure 2:
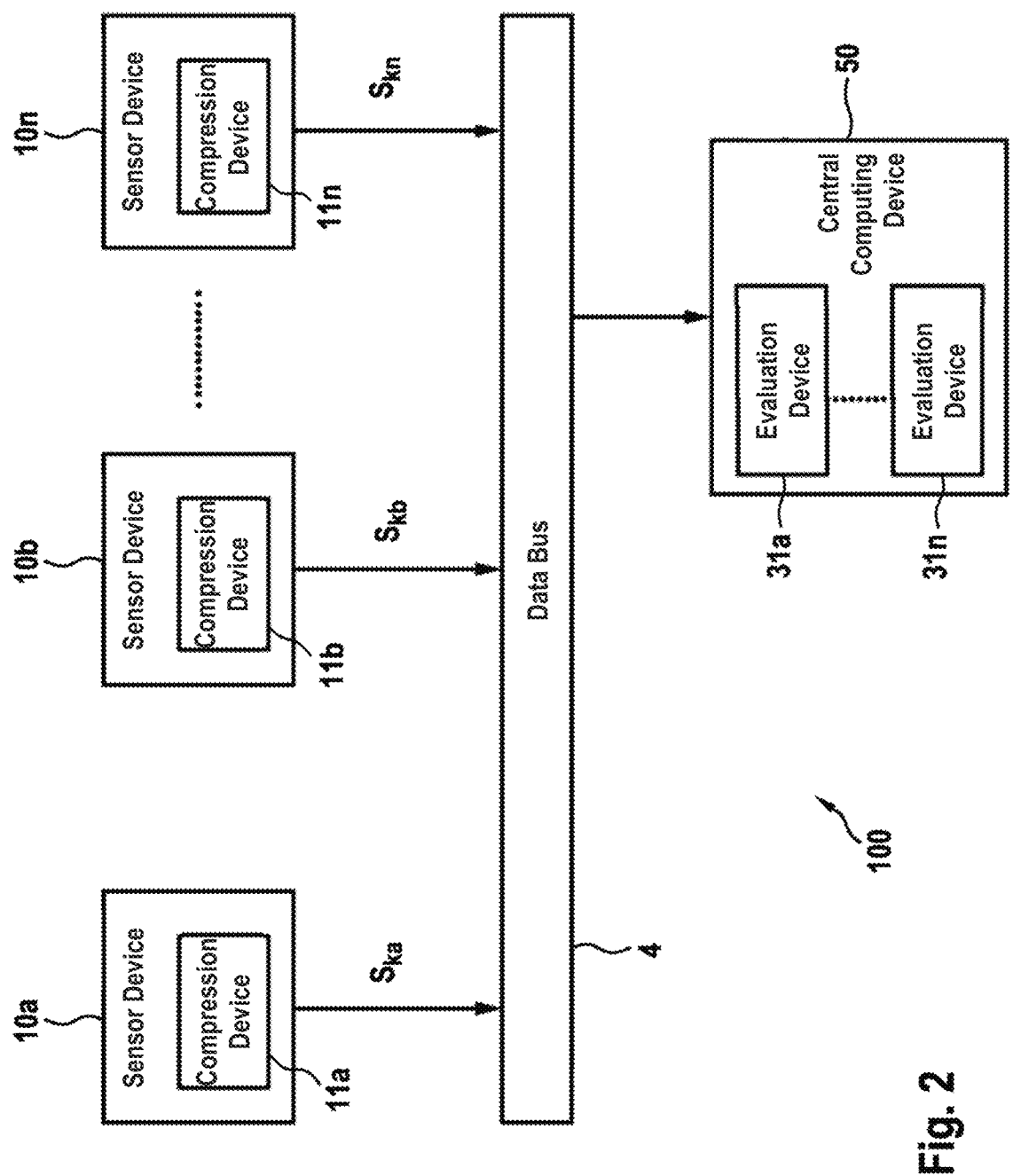
FIG. 2 shows a basic representation of a proposed object identification system at run time during normal operation.

An embodiment of a proposed object identification system 100 is represented schematically in FIG. 2. It is possible to see multiple sensor devices 10a ... 10n (e.g. LiDAR sensor, radar sensor, ultrasonic sensor, camera, etc.), which for example are installed in a vehicle and are intended to ascertain image data 1 when detecting surroundings of the vehicle. In each of the sensor devices 10a ... 10n it is possible to see a compression device 11a ... 11n comprising a first neural subnetwork 20 trained according to the disclosure or a standard compression device trained according to the disclosure, which is used to compress the image data 1 captured by the sensor devices 10a ... 10n to form compressed sensor data $S_{ka} \ldots S_{kn}$ and to supply them to a data bus 4 (e.g. CAN bus).

The data bus 4 is used to supply the compressed sensor data $S_{ka} \ldots S_{kn}$ to a central computing device 50 in which at least one evaluation device 31a ... 31n is arranged. The evaluation devices 31a ... 31n use the compressed sensor data $S_{ka}$ ... $S_{kn}$ to perform object identification (e.g. pedestrian identification, vehicle identification, road sign identification, etc.) in accordance with the further neural subnetworks 30a ... 30n.

In this manner, an object identification system 100 having one or more sensor devices 10a ... 10n, each of which has sensor-end computing units in the form of the compression devices 11a ... 11n for the data compression, and one or more central computing devices 50 for the further processing of the compressed image data is provided. The central computing device 50 usually has a processing power that is greater by multiple orders of magnitude than that of the sensor-end computing units, or first neural subnetworks 20, of the sensor devices 10a ... 10n.

The proposed object identification system 100 allows a reduction in the volume of data that is transferred from the sensor devices 10a ... 10n to the central computing device 50, without thereby adversely affecting the functional performance of the object identification system 100. To this end, the image data 1 are compressed at the sensor end with the aid of the parameterized, or trained, compression device 11a ... 11n. The algorithm of the parameterized compression device 11a ... 11n may be trained e.g. by means of a first neural subnetwork 20 in the manner mentioned above; in an alternative variant, the compression device 11a ... 11n may also be in the form of a parameterizable standard compression method.

In this case, the transmitter-end neural network modifies the data beforehand in such a way that better compression results can be obtained using the standard method. A standard compression method also needs to weigh up two objectives:

Compression grade: how heavily are the data compressed in accordance with the first target function $Z_1$?

Compression quality: how well are the original data preserved by the compression, or how great is the error made by the compression?

A general dimension (e.g. entropy) is used for the further target functions $Z_{2a}$ ... $Z_{2n}$ in the standard compression method. However, this includes no semantic knowledge about the scene. As explained above, specific image areas have a high entropy but are not necessarily relevant from the point of view of object identification. Despite the high entropy, it is entirely possible for these image areas to have specific characteristics (e.g. a typical color profile, typical edge structure, etc.) that exclude a sought object on a "trivial" basis.

This is the starting point for the proposed method: a general dimension for measuring the compression quality is replaced by a dimension that receives semantic knowledge of the target application (e.g. object identification). While entropy may be noted down as a closed target function, this new dimension is defined by the following factors:

the target function of the object identification the model for object identification. In the case of a neural network, this is the network structure and its free, "learnable" parameters the annotated training data 3 that are used to learn the object identification While entropy is a fixed dimension, this compression dimension changes over the course of the collective training process of the neural network 40, since the object identification itself has learnable parameters, of course. As a result, the "compression network" 20 learns which image areas/texture patterns may be simplified/compressed without the object identification by means of the "application network" 30a ... 30n suffering, and at the same time the object identification adapts itself to match the learnt compression.

This means that better results are obtained than if components are considered in isolation, as is the case in standard compression methods. The compressed image data $S_{ka}$ ... $S_{kn}$ are transferred to the central computing device 50. Optionally, the compressed image data $S_{ka}$ ... $S_{kn}$ are decompressed there, or the compressed image data are used for the object identification. Finally, the compressed image data are processed further by one or more evaluation devices 31a ... 31n (e.g. object detection and/or semantic segmentation by means of the compressed sensor data).

The object identification system 100 of FIG. 2 therefore represents a reproduction of the neural network 40 after the training phase has been terminated. The now trained neural subnetworks 20, 30a ... 30n are used in the sensor devices 10a ... 10n, or the central computing device 50, there being no further provision for learning by the neural subnetworks 20, 30a ... 30n at the run time of the object identification system 100. A new training process with new annotated training data 3 would need to be started for this purpose.

The optimization of the further target function $Z_{2a}$ ... $Z_{2n}$ may consist e.g. in an object (e.g. pedestrian, vehicle, objects, etc.) being identified by one of the sensor devices 10a ... 10n as well as possible. In this manner, the target functions $Z_1$ ... $Z_{2n}$ of the neural subnetworks 20, 30a ... 30n are therefore optimized as a whole and simultaneously.

Consequently, this means that adequate, or optimized, object identification can still be achieved with optimized compressed image data $S_{ka}$.

The proposed method advantageously allows mutually coordinated use of machine learning techniques both during compression and during further processing to be used either to achieve higher compression rates or to achieve better results for the further processing (e.g. object identification) than would be possible with conventional compression.

It is possible to see that there may be provision for multiple evaluation devices 31a ... 31n within the computing device 50 in FIG. 2, all evaluation devices 31a ... 31n being supplied with the same compressed image data $S_k$ in this case. This allows multiple optimization in a simple manner.

Compression can also be achieved without an explicit target function by selecting the number of output neurons of the compression network to be smaller than a dimensionality of the image data 1. In this manner, the first target function may be provided merely by way of a structuring of the compression device 11a (not depicted in figures).

The application-specific target function may for its part consist of a combination of multiple target functions $Z_1$ ... $Z_n$ for different applications.

A central concept of the proposed method is therefore that the compression is tailored to the subsequent further processing of the compressed sensor data.

A signal processing chain may e.g. have the following appearance:

An image with associated image data 1 is recorded in a sensor

The signal is compressed at the sensor end using the "compression network" 20

The compressed image data are sent to the central computing device 50 via the data bus 4

The compressed image data are processed in the central computing device 50 by way of the application-specific neural network(s)

Example

Input image of size 640×480 pixels, three input channels (RGB—red, green, blue). Number of input neurons=number of R, G, B pixels=640×480×3=921 600 neurons. Output layer for the intermediate representation is constructed as a grid of 320×240 neurons (76 800 neurons), meaning a reduction in the size of the data to be transferred via the data bus by a factor of twelve.

Put another way, this means that instead of an RGB image of size 640×480 it is now only necessary to send a single-channel image of size 320×240 via the data bus.

Figure 3:
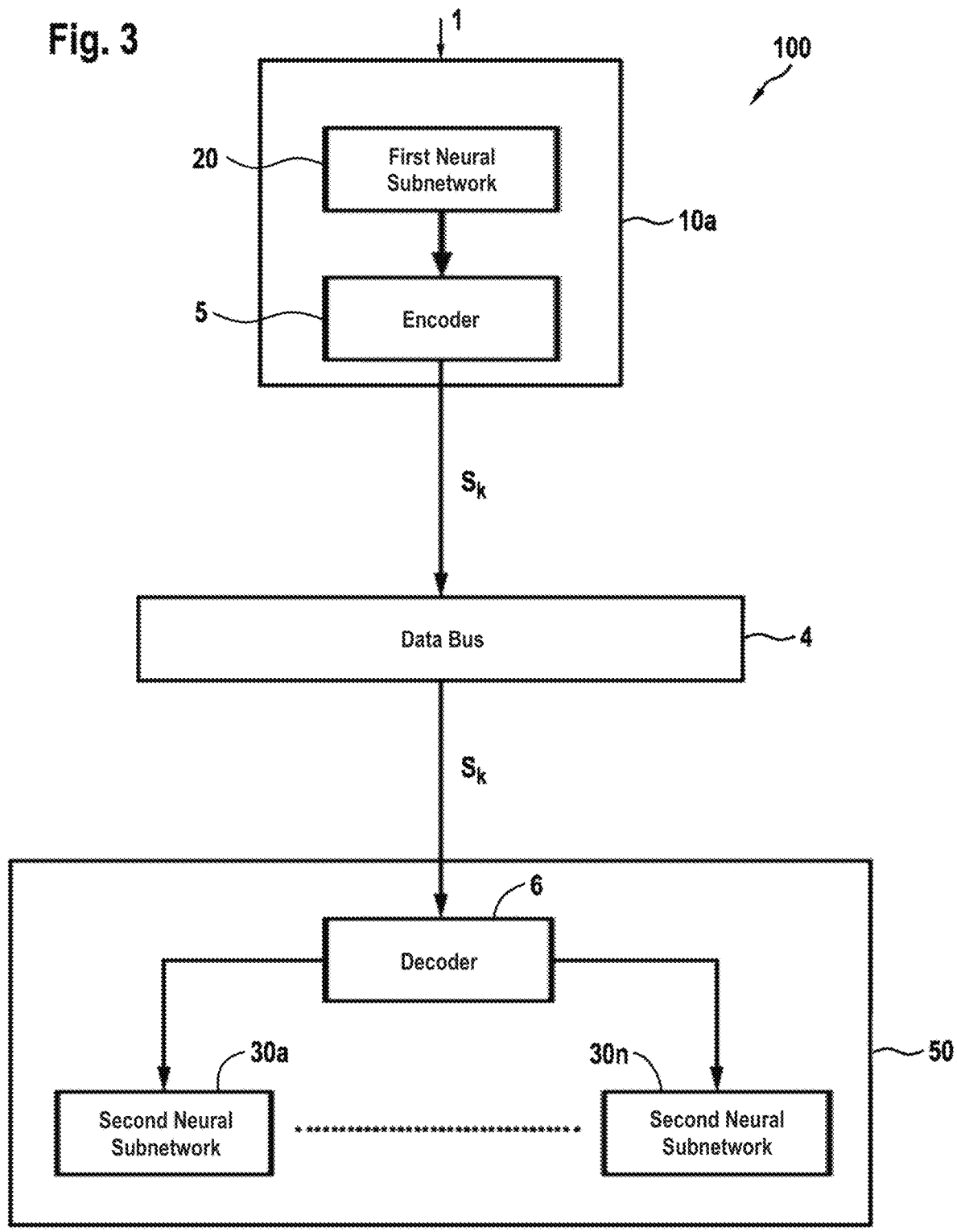
FIG. 3 shows a basic representation of a variant of the proposed object identification system at run time during normal operation.

FIG. 3 schematically shows a further embodiment of a proposed object identification system 100. In this case, the image data 1 are compressed by means of the first neural subnetwork 20 in the sensor device 10a and subsequently supplied to an encoder 5. At the output of the encoder 5, the compressed image data $S_K$ are supplied to the data bus 4. The data bus 4 supplies the compressed image data $S_k$ to a decoder 6, which distributes the data to the neural subnetworks 30a . . . 30n. This variant also results in the compression and the object identification being split over the sensor device 10a and the central computing device 50, respectively.

The "compression network" computes an intermediate representation that is smaller than, the same size as or larger than the raw sensor data or image data. This intermediate representation has been manipulated, however, with the result that it can easily be compressed in a lossless manner by way of a further method. The sensor end incorporates a compression unit that implements a standard method for lossless compression (e.g. entropy coding). There is provision on the central computing device 50 for an appropriate decompression unit in the form of the decoder 6. The signal processing chain in this case has the following appearance:

- An image with associated image data is recorded in the sensor
- Computation of an intermediate representation by way of the compression network. This step is generally lossy, that is to say that the original data cannot be reconstructed from this intermediate representation without error
- Sensor-end, lossless compression of the intermediate representation
- The compressed intermediate representation is sent to the central computing device 50 via the data bus 4
- The compressed intermediate representation is decoded by the decompression unit in the form of the decoder 6
- Further processing of the decompressed intermediate representation by way of the application-specific neural network(s)

The compression and decompression themselves do not need to be implemented during the training phase, i.e. the diagram for the training process does not change.

Example

Input image of size 640×480 pixels, 8 bits per pixel.
Intermediate representation: processed image of size 640×480, 8 bits per pixel. The compression network has reduced the entropy of the data, however.

The compression may now be performed using a standard method such as e.g. entropy coding.

FIG. 4 shows a basic flowchart for an embodiment of the proposed method.

In a step 200, annotated training data 3 are provided, comprising image data 1 having defined associations 2 with at least one object.

In a step 210, a neural network 40 having a first neural subnetwork 20 intended to perform compression of the training data 3 is trained, the first neural subnetwork being connected up to at least one further neural subnetwork 30a . . . 30n, wherein the at least one further neural subnetwork 30a . . . 30n is intended to identify an object from the compressed training data 3.

In a step 220, parameterization of the first neural subnetwork 20 is performed in such a way that the object identification by means of the at least one further subnetwork 30a . . . 30n is performed at a defined grade, and wherein the neural subnetworks 20, 30a . . . 30n are trained collectively.

The proposed method is preferably in the form of a computer program comprising program code means for performing the method on the compression device and on the evaluation device. The compression devices and the evaluation devices may both be in the form of software, the compression devices being loaded onto the sensor devices after optimization has taken place and being intended for normal operation there.

Although the disclosure has been described above on the basis of concrete exemplary embodiments, a person skilled in the art may also realize embodiments not disclosed or only partly disclosed above, without departing from the essence of the disclosure.

The invention claimed is:

1. A method for configuring an object identification system, comprising:
   providing annotated training data comprising image data having defined associations with at least one object; and
   training a neural network having a first neural subnetwork operably connected to at least one second neural subnetwork, the first neural subnetwork being configured to perform compression of the annotated training data, the at least one second neural subnetwork being configured to perform object identification to identify the at least one object from the compressed training data, the first neural subnetwork and the at least one second neural subnetwork being trained collectively, the training including:
      evaluating a first target function based on outputs of the first neural subnetwork, the first target function specifying an extent of the compression performed by the first neural subnetwork;
      evaluating at least one second target function based on outputs of the at least one second neural subnetwork, the at least second target function specifying a grade of the object identification performed by the at least one second neural subnetwork;
      ascertaining weights of the first neural subnetwork based on the evaluation of the first target function and based on the evaluation of the at least one second target function; and
      ascertaining weights of the at least one second neural subnetwork based on the evaluation of the at least one second target function.

2. The method as claimed in claim 1, wherein:
   areas of the annotated training data with high entropy are compressed less than areas of the annotated training data with low entropy, and
   the annotated training data with low entropy including image data with the same color and/or image data with a recurring pattern.

3. The method as claimed in claim 1, wherein the at least one second target function defines at least one of identification of a person, identification of a vehicle, and identification of infrastructure.

4. The method as claimed in claim 1, wherein a computer program comprises instructions that, when the computer program is executed by a computer, cause said computer to perform the method.

5. A method for identifying an object using an object identification system, comprising:
providing image data of the object;
compressing the image data using a compression device having a first neural subnetwork, the first neural subnetwork being configured to perform compression of the annotated training data; and
performing object identification from the compressed image data using an evaluation device having at least one second neural subnetwork, the at least one second neural subnetwork being configured to perform object identification to identify the at least one object from the compressed training data,
wherein the object identification system is configured by:
providing annotated training data comprising image data having defined associations with the object; and
training the first neural subnetwork and the at least one second neural subnetwork, the first neural subnetwork and the at least one second neural subnetwork being trained collectively, the training including:
evaluating a first target function based on outputs of the first neural subnetwork, the first target function specifying an extent of the compression performed by the first neural subnetwork;
evaluating at least one second target function based on outputs of the at least one second neural subnetwork, the at least second target function specifying a grade of the object identification performed by the at least one second neural subnetwork;
ascertaining weights of the first neural subnetwork based on the evaluation of the first target function and based on the evaluation of the at least one second target function; and
ascertaining weights of the at least one second neural subnetwork based on the evaluation of the at least one second target function.

6. The method as claimed in claim 5, wherein:
simplified image data with reduced entropy are generated from the image data, and
the simplified image data are subsequently compressed using a parameterized standard compression device.

7. The method as claimed in claim 5, wherein the compressing of the image data is performed using a parameterized standard compression device.

8. The method as claimed in claim 5, wherein a sensor device includes a compression device configured to perform the method.

9. The method as claimed in claim 5, wherein a computer program comprises instructions that, when the computer program is executed by a computer, cause said computer to perform the method.

10. The method as claimed in claim 9, wherein a non-transitory machine-readable storage medium is configured to store the computer program.

11. An object identification system comprising:
a defined number of functionally interconnected sensor devices; and
a computing device operably connected to the sensor devices via a data bus for performing object identification from compressed image data,
wherein the computing device is configured by:
providing annotated training data comprising image data having defined associations with at least one object; and
training a neural network having a first neural subnetwork operably connected to at least one second neural subnetwork, the first neural subnetwork being configured to perform compression of the annotated training data, the at least one second neural subnetwork being configured to perform object identification to identify the at least one object from the compressed training data, the first neural subnetwork and the at least one second neural subnetwork being trained collectively, the training including:
evaluating a first target function based on outputs of the first neural subnetwork, the first target function specifying an extent of the compression performed by the first neural subnetwork;
evaluating at least one second target function based on outputs of the at least one second neural subnetwork, the at least second target function specifying a grade of the object identification performed by the at least one second neural subnetwork;
ascertaining weights of the first neural subnetwork based on the evaluation of the first target function and based on the evaluation of the at least one second target function; and
ascertaining weights of the at least one second neural subnetwork based on the evaluation of the at least one second target function.

12. The object identification system as claimed in claim 11, wherein:
the first neural subnetwork is arranged on the sensor device, and
the at least one second neural subnetwork is arranged on the computing device.

* * * * *